Aug. 22, 1939.     E. R. FITCH     2,170,240
MASTER CONTROLLER DEVICE
Filed Sept. 22, 1937
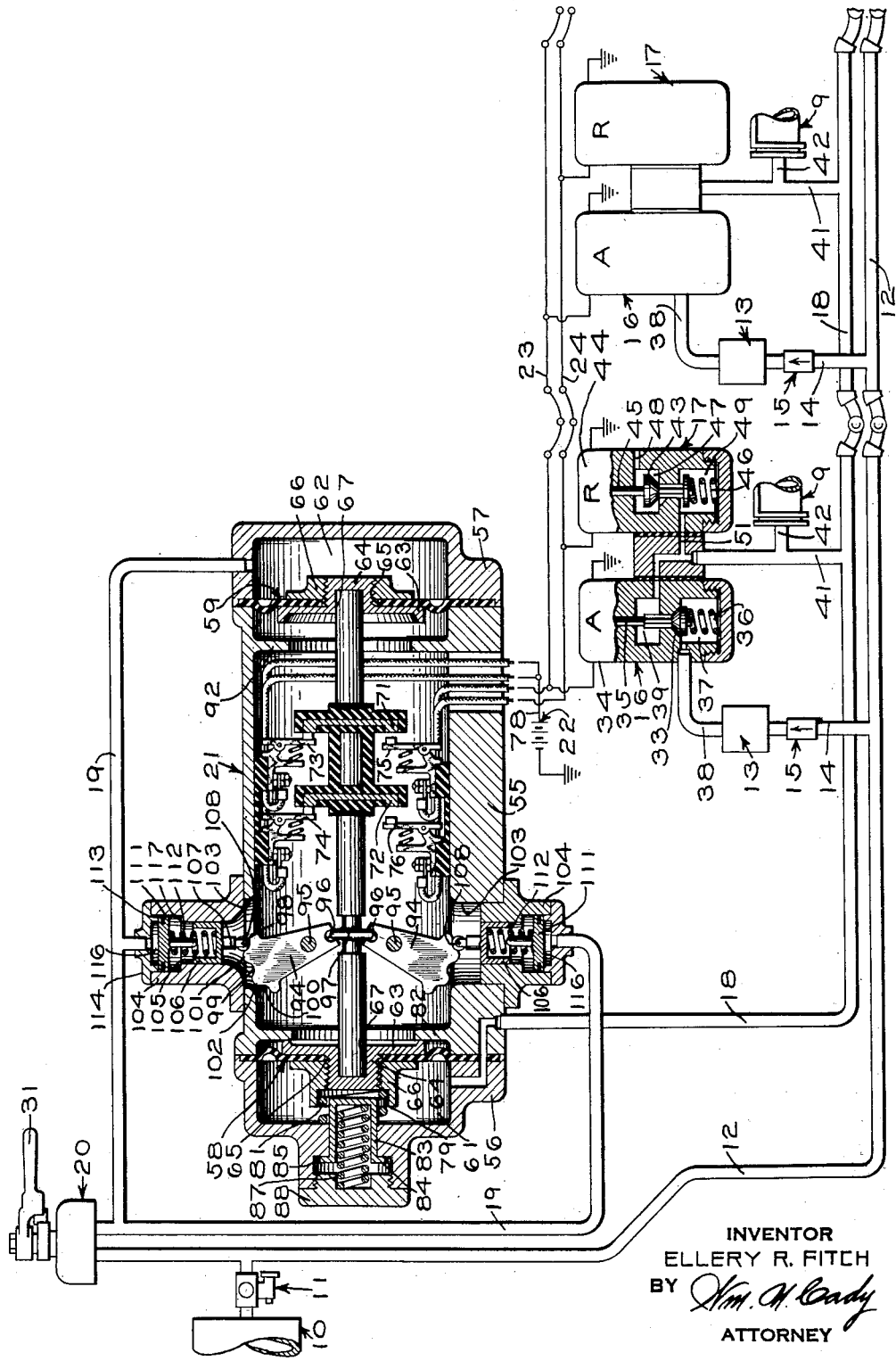
INVENTOR
ELLERY R. FITCH
BY *Wm. N. Cady*
ATTORNEY Patented Aug. 22, 1939

2,170,240

UNITED STATES PATENT OFFICE 2,170,240

MASTER CONTROLLER DEVICE

Ellery R. Fitch, Irwin, Pa., assignor to The Westinghouse Air Brake Company, Wilmerding, Pa., a corporation of Pennsylvania Application September 22, 1937, Serial No. 165,106

11 Claims. (Cl. 303—20)

This invention relates to master controller devices and has particular relation to master controller devices employed in brake systems for vehicles such as railway trains.

Various train brake control equipments have been proposed including a so-called straight-air pipe extending throughout the length of the train, the pressure in the various brake cylinders along the length of the train being controlled correspondingly, either directly, or indirectly through relay devices, according to the pressure in the straight-air pipe. In order to effect substantially synchronous and uniform variations of pressure in the straight-air pipe along the entire length thereof, so-called application and release magnet valve devices are commonly employed at intervals along the length of the train for controlling the supply of fluid under pressure to and the release of fluid under pressure from the straight-air pipe, all of the application and release magnet valve devices being controlled by a so-called master controller located on one car of the train, such as the locomotive.

A form of master controller is disclosed and claimed in Patent 2,068,345 to Donald L. McNeal which comprises two interconnected spaced movable abutments or diaphragms adapted to effect the operation of electrical switches controlling the application and release magnet valve devices which in turn control the pressure in the straight-air pipe. In the form of master controller shown in the above-mentioned patent, one of the diaphragms is subjected on one side to a control pressure which shifts both the diaphragms and causes operation of the switches to cause the application and release magnet valve devices to be operated to supply fluid under pressure to the straight-air pipe. The other diaphragm is subjected on one side to the pressure established in the straight-air pipe and acting in opposition to the established control pressure acting on the other diaphragm so that when the pressure in the straight-air pipe builds up sufficiently the switches are operated to so control the application and release magnets as to lap the supply of fluid under pressure to the straight-air pipe. Thus the pressure established in the straight-air pipe is caused to correspond to the control pressure established.

Such a form of master controller is subject to the possibility of a pumping action due to overcasting. For example, if a certain control pressure is established, and a fluid pressure corresponding to the pressure in the straight-air pipe is not immediately and promptly established on the diaphragm of the master controller, due in some instances to the time required for the fluid to flow to the master controller from the straight-air pipe, the switch controlling the application magnet valve device will not be operated to lap the supply of fluid under pressure to the straight-air pipe promptly enough, and thus when the pressure established in the straight-air pipe and that acting on the diaphragm of the master controller ultimately equalize following closing off of the supply to the straight-air pipe, such pressure will be excessive and will so predominate over the control pressure established on the other diaphragm as to cause the switch controlling the release magnets to be operated to effect release of fluid under pressure from the straight-air pipe.

If the reduction of fluid pressure acting on the diaphragm of the master controller is slower than the reduction in straight-air pipe pressure due to the time required for fluid under pressure to flow from the master controller to the straight-air pipe, then the switch of the master controller which controls the release magnet valve devices will not be operated back to lap position soon enough as to prevent excessive release of fluid under pressure from the straight-air pipe. Thus, when the release of fluid under pressure from the straight-air pipe is eventually cut off by the release magnet valve devices, the established control pressure will again predominate and thus the above-described cycle of operation of the master controller will occur repeatedly and in succession indefinitely.

Such pumping operation of the master controller causes undue and unnecessary wear of the mechanical and electrical parts of the master controller and also causes a fluctuating pressure in the straight-air pipe which results in fluctuations in the degree of application of the brakes.

It is accordingly an object of my invention to provide a master controller device so constructed and arranged that such pumping operation thereof will not occur, thereby insuring a stable and non-fluctuating straight-air pipe pressure in response to any given control pressure which may be established.

More specifically, it is an object of my invention to provide a master controller having a stabilizing or dampening device for preventing pumping operation thereof.

The above objects, and other objects of my invention will be made apparent in the subsequent description of my invention when read in connection with the single figure of the accompanying drawing, which shows in simplified diagrammatic form an electro-pneumatic fluid pressure brake system including one embodiment of a master controller device constructed according to my invention.

Description of equipment

The equipment shown in the single figure of the drawing includes two or more brake cylinders 9, a main reservoir 10, a feed valve device 11 of well-known construction adapted to regulate the pressure of the fluid supplied from the main reservoir 10 to a pipe 12, hereinafter referred to as the feed valve pipe, to a certain pressure lower than the pressure in the main reservoir, two or more supply reservoirs 13, one for each brake cylinder, the supply reservoirs 13 being charged with fluid under pressure from the feed valve pipe 12 through corresponding branch pipes 14 containing a one-way or check valve 15, a plurality of sets of application and release magnet valve devices each of which includes an application magnet valve device 16 and a release magnet valve device 17, a so-called straight-air pipe 18, a so-called control pipe 19, and a brake valve device 20 illustrated as of a simple rotary type.

According to my invention there is also provided a master controller device 21 to which the straight-air and control pipes 18 and 19 are connected and which is operated, in a manner to be hereinafter described, to control the energization and deenergization of the application and the release magnet valve devices 16 and 17 by current supplied from a suitable source of electrical energy, such as a battery 22, through the medium of suitable application and release train wires 23 and 24 respectively.

Considering the parts of the equipment in greater detail, the brake valve device 20 is illustratively shown as of the simple rotary type comprising a rotary valve (not shown), adapted to be operated by an operating handle 31 into the various brake control positions, such as release, lap, service application and emergency application.

In the release position of the operating handle 31, the rotary valve establishes communication through which the control pipe 19 is connected to atmosphere. With the operating handle 31 in lap position, the rotary valve is positioned to lap or close the connection from the control pipe 19 to atmosphere. In the service application position of the operating handle 31, the rotary valve is positioned to establish communication through which fluid under pressure is supplied from the feed valve pipe 12 to the control pipe 19 at a certain rate hereinafter designated a service rate. To effect a service application of the brakes the operating handle 31 is shifted out of release position to service application position until a pressure corresponding to the desired degree of application is established in the control pipe and then shifted to lap position.

With the operating handle 31 in emergency position, the rotary valve is positioned to cause fluid under pressure to be supplied from the feed valve pipe 12 to the control pipe 19 at a fast rate hereinafter referred to as an emergency rate. To effect an emergency application of the brakes, the operator shifts the operating handle 31 to emergency position and allows it to remain there, thus causing a fluid pressure to be established in the control pipe 19 equivalent to the pressure in the feed valve pipe 12 and thereby effecting a maximum degree of application of the brakes.

The one-way or check valves 15 are conventional in construction and are adapted to permit the supply of fluid under pressure from the feed valve pipe 12 through the branch pipes 14 to the respectively associated supply reservoirs 13 and to prevent back flow of fluid under pressure from the supply reservoirs 13 to the feed valve pipe 12.

Each application magnet valve device 16 may comprise a supply valve 33 and an electromagnet winding 34 effective, when energized, to actuate a plunger 35 to unseat the supply valve 33 against the resisting force of a spring 36, which is effective to yieldingly urge the release valve 33 to seated position when the electromagnet winding 34 is deenergized. The supply valve 33 is contained in a chamber 37 which is connected to a corresponding supply reservoir 13 by a pipe 38. When the supply valve 33 is unseated, it establishes communication from the chamber 37 to a chamber 39 which is constantly connected to the straight-air pipe 18 through a branch passage and pipe 41.

For simplicity, each brake cylinder 9 is illustrated as connected directly to the branch pipe 41 by a second branch pipe 42 but it will be understood that relay valve devices controlled according to the pressure in the straight-air pipe 18 may be provided for controlling the supply of fluid under pressure to the brake cylinder.

Each release magnet valve device 17 may comprise a release valve 43 and an electromagnet winding 44 which is effective, when energized, to actuate a plunger 45 to shift the release valve 43 into seated position on an associated valve seat against the resistance of a spring 46 which is effective to yieldingly urge the release valve 43 to unseated position upon deenergization of the electromagnet winding. The release valve 43 is contained in a chamber 47 which is constantly open to atmosphere through an exhaust port 48. When the release valve 43 is unseated as shown, it establishes communication from a chamber 49, which is constantly connected to the branch passage and pipe 41 through a branch passage 51, to the atmospheric chamber 47 thereby effecting release of fluid under pressure from the straight-air pipe 18.

The master controller device 21 may comprise a casing having a main or central section 55 of tubular construction and two end or cover sections 56 and 57 at the opposite ends of the central section 55. Two movable abutments or diaphragms 58 and 59 are provided, the diaphragm 58 having a peripheral gasket portion adapted to be clamped between the central casing section 55 and the end section 56 and the diaphragm 59 having a peripheral gasket portion adapted to be clamped between the central casing section 55 and the end section 57. Formed between the diaphragm 58 and the end casing section 56 is a chamber 61 to which the straight-air pipe 18 is constantly connected. Also, there is formed between the diaphragm 59 and the end casing section 57 a chamber 62 to which the control pipe 19 is constantly connected.

Secured to the inner faces of each of the diaphragms 58 and 59 is a peripherally flanged disc or follower 63 having a central threaded stem 64 which projects through a central opening 65 in the diaphragm, a suitable nut 66 being provided for the end of the stem 64 for securely attaching the follower 63 to the corresponding diaphragm.

Each of the followers 63 is provided with a central bore or recess 67, the two bores 67 facing toward each other and receiving therein with a close fit, the opposite ends respectively of a rod or stem 68.

Carried in axially spaced and insulated relation on the rod 68 are two contact-bridging members 71 and 72. Attached to the upper wall of the central casing section 55 are two spring-biased contact members 73 and 74 adapted to be constantly engaged, respectively, by the contact-bridging members 71 and 72.

Suitably attached in insulated relation to the lower wall or base of the central casing section 55 are a pair of spring biased contact members 75 and 76 so axially spaced that the contact-bridging member 71 first engages the contact member 75 and then the contact-bridging member 72 engages the contact member 76, as the rod 68 is shifted in the left-hand direction from the normal position shown in the drawing.

Both of the contact members 73 and 74 are connected to one terminal of the battery 22, such as the positive terminal, by a wire 78 and the train wires 23 and 24 are connected, respectively, to the contact members 75 and 76. One terminal of the electromagnet winding 34 of the application magnet valve devices 16 and one terminal of the electromagnet winding 44 of the release magnet valve devices 17 are connected, respectively, to the application train wire 23 and release train wire 24, the opposite terminals of the electromagnet windings being connected to the negative terminal of the battery 22, as through a ground connection in the manner shown.

It will thus be seen that when the rod 68 is shifted in the left-hand direction from the position shown in the drawing, the contact-bridging member 71 first engages the contact member 75 thereby connecting contact members 73 and 75 and establishing a circuit for energizing the electromagnet winding 44 of each of the release magnet valve devices 17. When the rod 68 is moved further in the left-hand direction, the contact member 72 engages the contact finger 76 and thus connects the contact members 74 and 76 to complete the circuit for energizing the electromagnet winding 34 of each of the application magnet valve devices 16.

Formed in the outer face of the nut 66 associated with the diaphragm 58 is a recess 79, and a coil spring 81, hereinafter designated the release spring, is interposed between the end casing section 56 and the nut 66, one end of the spring being received and supported in the recess 79. The release spring 81 urges the diaphragms and the rod 68 in the right-hand direction to the position shown wherein the follower 63 associated with the diaphragm 58 engages an annular flange 82 formed on the interior of the central casing section 55, thereby establishing the limit of movement of the rod 68 in the right-hand direction.

Suitably guided in a bore in the end cover section 56 is a graduating stop member 83 which extends into the chamber 61 in axial alignment with the rod 68 and is yieldingly biased to a maximum inward position, determined by the engagement of a flange 84 thereon with a stop shoulder 85 on the casing section 56, by a coil spring 87 hereinafter called the graduating spring which is interposed between the stop member 83 and a threaded plug 88 screwed into the outer end of the end casing section 56.

The inner end of the stop member 83 is normally spaced from the end of the stem 64 of the follower 63 associated with the diaphragm 58 so that the movement of the rod 68 in the left-hand direction is resisted first by only the release spring 81 and then, after the rod 68 has moved sufficiently in the left-hand direction to cause the end of the stem 64 of the follower 63 associated with the diaphragm 58 to engage the stop member 83, by both the spring 81 and the spring 87.

After compression of both springs 81 and 87, the movement of the rod 68 in the left-hand direction is limited by the engagement of the follower 63 on the diaphragm 59 with an annular stop flange 92 on the interior of the central casing section 55.

According to my invention, the master controller device 21 further comprises a stabilizing or dampening device for yieldingly resisting movement of the rod 68 in either the right-hand or the left-hand direction. This stabilizing device may comprise one or more toggle levers 94, two of which are shown for purposes of illustration, the levers 94 being pivoted intermediate the ends thereof on suitable transverse pins or rods 95 fixed or secured in the central casing section 55. Each of the levers 94 has a U-shaped recess 96 at the inner end thereof and the levers 94 are so mounted on the pins 95 that a collar or flange 97 formed on or attached to the rod 68 interlockingly engages in the recesses 96 of the levers.

Each of the toggle levers 94 has at the outer end thereof a plurality of grooves or recesses 98, 99 and 100, angularly spaced on the arc of movement of the lever, the grooves 98 and 99 being separated by a rounded rib 101 and the grooves 99 and 100 being separated by rounded rib 102.

The opposite walls of the central casing section 55 have openings 103 therein in alignment with the toggle levers 94 and, separately attached in any suitable manner to the central casing section 55 over the openings 103, are fittings or casing sections 104. Each of the casing sections 104 has a bore 105 therein extending in a direction radial to the axis of the rod 68 and registering with the openings 103. Contained in each of the bores 105 is a piston 106 having a stem 107 at the inner end thereof which carries thereon a roller 108 adapted to engage in the grooves 98, 99 and 100 of a corresponding toggle lever 94.

In the outer portion of the bore 105 in each of the casing sections 104 is a piston 111 and interposed between the piston 111 and the outer face of the piston 106 is a coil spring 112 which yieldingly urges the piston 106 radially inward to cause the rollers 108 to yieldingly engage in the grooves 98, 99 and 100 of the toggle levers 94.

Normally, the pistons 111 are urged radially outward into engagement with an annular rib 113 formed on the inner face of an end cover 114 attached to the outer end of each of the casing sections 104. Formed between the piston 111 and the end cover 114 of each of the casing sections 104 is a chamber 116, all of the chambers 116 being connected to and subject to the pressure of fluid in the control pipe 19.

When the pressure of the fluid in the control pipe 19 exceeds a certain uniform low pressure, such as two or three pounds per square inch, the pistons 111 are urged radially inward into engagement with a stop shoulder 117 formed on the casing section 104 between the inner smaller and outer larger portion of the bore 105, thus causing the tension of the coil spring 112 to be increased to a certain uniform tension.

*Operation of equipment*

Assuming that the main reservoir 10 is charged with fluid at the normal pressure carried therein in the usual manner by a fluid compressor, not shown, each of the supply reservoirs 13 throughout the train is charged to the pressure as regulated by the feed valve device 11 from the feed valve pipe 12 through the corresponding branch pipe 14 and past the one-way valve 15.

Now assuming that the train of cars is traveling along the road with the brake valve handle 31 in release position and the brakes accordingly released, a service application of the brakes may be effected by turning the brake valve handle 31 from release position to service position to establish a pressure in the control pipe 19 corresponding to a desired degree of brake application, and then shifting the handle to lap position.

When the pressure of the fluid in the control pipe 19 exceeds a certain uniform unit pressure, such as two pounds per square inch, each piston 111 is shifted radially inward into engagement with the stop shoulder 117 to increase the tension of the spring 112 to its certain maximum degree. Since the release spring 81 exerts a force tending to hold the follower 63 on the diaphragm 58 in contact with the annular stop flange 82 and since the roller 108 on the piston 106 is engaged in the groove 98 of a toggle lever 94 and yieldingly held therein by the spring 112, it will be apparent that the movement of the rod 68 in the left-hand direction is prevented until the fluid pressure established in the chamber 62 connected to the control pipe 19 exceeds a certain uniform pressure, such as ten pounds per square inch.

When the pressure of the fluid in the chamber 62 of the master controller device 21 exceeds such certain uniform pressure, the resistance of the release spring 81 and of the springs 112, hereinafter called the toggle springs, yieldingly holding the rollers 108 in the grooves 98 of the toggle levers 94 is overcome and the rod 68 is thus moved axially in the left-hand direction. When the rod 68 is moved sufficiently in the left-hand direction from the position shown, the rollers 108 are snapped over the rib 101 into the central groove 99 of the toggle levers 94, the rod 68 thus being shifted to a position in which the end of the stem 64 of the follower 63 on the diaphragm 58 just engages the inner end of the stop member 83.

In this position of the rod 68, hereinafter called the lap position, the contact-bridging member 71 connects the contact members 73 and 75 and the circuit previously described is thus completed for energizing the electromagnet winding 44 of each of the release magnet valve devices 17. The release valve 43 of each release magnet valve device 17 is thus shifted to seated position to close off or lap the exhaust communication from the branch pipe 41 and connected straight-air pipe 18 and brake cylinders 9 to atmosphere through the exhaust port 48.

In view of the fact that the stem 64 of the follower 63 associated with the diaphragm 58 now engages the end of the stop member 83, it will be apparent that further movement of the rod 68 in the left-hand direction is opposed by the force of the graduating spring 87 as well as by the release spring 81 and the toggle springs 112, and thus the pressure in the chamber 62 must increase further a certain uniform amount, such as five pounds per square inch, in order to cause further movement of the rod 68 in the left-hand direction.

When the pressure of the fluid in the chamber 62 of the master controller device 21 increases by such certain uniform unit pressure, the rod 68 is moved in the left-hand direction sufficiently to cause the rollers 108 to snap over the rib 102 on the toggle levers 94 into the groove 100.

The rod 68 is thus shifted to a position, hereafter called the application position in which the contact-bridging member 72 connects the contact members 74 and 76 and thus completes the circuit previously described for energizing the electromagnet winding 34 of each of the application magnet valve devices 16. It will be apparent that the contact members 73 and 75 remain connected by the contact-bridging member 71 and are yieldingly moved to follow the movement of the rod 68.

Upon the energization of the electromagnet winding 34 of the application magnet valve devices 16, the supply valve 33 is unseated and thus fluid under pressure is supplied from each supply reservoir 13 to each corresponding brake cylinder 9 by way of the branch pipe 38, chambers 37 and 39, passage and pipe 41 and branch pipe 42.

Fluid under pressure supplied to pipe 41 flows to the straight-air pipe 18 and since the straight-air pipe 18 is connected to the chamber 61 of the master controller device 21, the pressure in the chamber 61 increases as the pressure in the straight-air pipe 18 increases.

The pressure of the fluid in the chamber 61 acting on the diaphragm 58 opposes the pressure in chamber 62 acting on the diaphragm 59 and when the pressure in the chamber 61 increases sufficiently, the rod 68 is urged in the right-hand direction until the rollers 108 snap back over the rib 102 on the toggle levers into the central groove 99 therein. With the rod 68 thus in lap position again, contact-bridging member 72 disengages the contact member 76 and thereby interrupts the circuit for energizing the electromagnet winding 34 of the application magnet valve devices 16. Upon deenergization of the electro-magnet 34, the supply valves 33 are reseated to cut off or lap the supply of fluid under pressure to the brake cylinders 9, straight-air pipe 18 and chamber 61 of the master controller device 21.

It will be apparent that the pressure in the chamber 61 must increase sufficiently to produce a differential force in the right-hand direction on the rod 68 sufficient to overcome the resistance to movement of the rod 68 exerted by the toggle springs 112 through the toggle levers 94. It will, furthermore, be apparent that with the rollers 108 engaging in the groove 100 of the toggle lever 94, that is, with the rod 68 in its extreme left-hand or application position, both the release spring 81 and the graduating spring 87 assist the pressure of the fluid in the chamber 61 to cause movement of the rod 68 in the right-hand direction in opposition to the pressure established in the chamber 62. With the rod 68 in lap position and the rollers 108 in the central grooves 99 of the toggle levers 94, the graduating spring 87 is ineffective to exert a force urging the rod 68 in the right-hand direction because the flange on the stop member 83 has engaged the stop shoulder 88.

If, now the pressure in the chamber 61 of the master controller device 21 tends to increase as it equalizes with or stabilizes at the pressure of the fluid in the straight-air pipe following the seating of the supply valve 33 of the application magnet valve devices 16, it must increase sufficiently to produce a differential force over the opposing force exerted by the fluid pressure in chamber 62 greater than the resistance offered to further movement of the rod 68 in the right-hand direction by the toggle springs 112 in order to cause the rod to be shifted further in the right-hand direction. However the resistance to further movement of rod 68 in the right-hand direction from the lap position offered by toggle springs 112 is adequate to prevent such movement of the rod 68 for any possible increase in the pressure of fluid in chamber 61 caused by equalization with the pressure in straight-air pipe 18 particularly since the graduating spring 87 no longer exerts a force on the rod 68.

Furthermore, the pressure in the chamber 62 will be ineffective to cause movement of the rod 68 in the left-hand direction to application position again because it has insufficient differential force over the combined force of the release spring 81, graduating spring 87, and the pressure in the chamber 61 to overcome the resistance offered to movement of the rod 68 out of lap position by the toggle springs 112 which maintain the toggle levers 94 in a vertical position thereof with the rollers 108 in the central grooves 99.

It will thus be apparent that when a given pressure is established in the control pipe 19 and in the chamber 62 of the master controller device 21, the master controller device 21 is operated through only one cycle to so control the application and release magnet valve devices 16 and 17 as to establish a corresponding pressure in the straight-air pipe 18 and in the brake cylinders 9 without repeated cycles of operation, that is, pumping. It will be apparent, furthermore, that no pumping operation of the master controller device 21 can occur because the stabilizing or dampening arrangement including the toggle levers 94 exerts a force sufficient to resist undesired movement of rod 68 in either direction from one brake control position to another.

If it is desired to increase the degree of a brake application, the operator again shifts the brake valve handle 31 to service application position to effect the necessary increase in the pressure of the fluid in the control pipe 19 corresponding to the desired increase in the degree of brake application and then shifts the handle back to lap position. When the pressure established in the chamber 62 of the master controller 21 increases sufficiently to overcome the combined opposing forces of the release spring 81, the graduating spring 87, the toggle springs 112 and the fluid pressure in the chamber 61, the rod 68 is again shifted in the left-hand direction and the rollers 108 snapped over the ribs 102 into the groove 100 of the toggle levers 94. The movement of rod 68 thus effected causes the contact-bridging member 72 to again engage the contact member 76 and effect energization of the electromagnet winding 34 of the application magnet valve devices 16. Upon energization of the electromagnet winding 34 of the magnet valve devices 16, supply valves 33 are again unseated and fluid under pressure again supplied from the supply reservoir 13 to the brake cylinders 9 and straight-air pipe 18. As in the previous instance, when the pressure in the chamber 61 is increased sufficiently that the differential force of the release spring 81, graduating spring 87 and the pressure of the fluid in chamber 61 over the pressure of the fluid in the chamber 62 is sufficient to overcome the resistance offered by the toggle springs 112, the rod 68 is again shifted to lap position. As in the previous instance, once the rod 68 is in lap position, it is necessary that the pressure in the chamber 61 be increased sufficiently to overcome the resistance of the toggle springs 112 in order to shift the rod 68 to a further extent from lap position to release position. However, as explained previously this cannot occur and thus the master controller device 21 is operated through only one cycle of operation to establish a pressure in the brake cylinders 9 and straight-air pipe corresponding substantially to the increased pressure established in the control pipe 19.

While the above operation of the master controller device 21 has been described as for a service application of the brakes, it will be apparent that it will operate in a similar manner for an emergency application of the brakes and it is deemed unnecessary therefore to repeat the operation of the master controller device 21 for an emergency application of the brakes.

Assuming that an application of the brakes has been effected in the manner previously described, and that it is desired to effect a partial release of the brakes, the operator may shift the brake valve handle 31 to release position to effect a reduction in pressure of the fluid in the control pipe 19 sufficient to effect a desired reduction in the degree of the brake application and then shift the handle to lap position. When the pressure of the fluid in the chamber 62 of the master controller device 21 reduces sufficiently that the differential force exerted by the fluid pressure in chamber 61 and by the release spring 81 is sufficient to overcome the resistance offered by the toggle springs 112, the rod 68 is shifted in the right-hand direction and the rollers 108 snap over the rib 101 on the toggle levers 94 into the groove 98, the rod 68 thus being shifted to its normal release position from the lap position thereof, Contact-bridging member 71 thus disengages the contact member 75 and interrupts the circuit for energizing the electromagnet winding 44 of the release magnet valve devices 17. The release valve 43 of the release magnet valve devices 17 is thus unseated and fluid under pressure released from the straight-air pipe 18, the chamber 61 of the master controller device 21 and the brake cylinders 9 by way of the exhaust port 48 of the release magnet valve devices.

When the pressure in the chamber 61 reduces sufficiently that the differential force exerted in the left-hand direction on the rod 68 by the pressure of the fluid in the chamber 62 is sufficient to overcome the resistance offered by the toggle springs 112, the rod 68 is again shifted in the left-hand direction and the rollers 108 snapped over the ribs 101 into the central grooves 99 on the toggle levers 94. If the pressure in the chamber 61 thereafter reduces to the pressure of equilibrium between chamber 61 and straight-air pipe 18 following seating of the reelase valve 43 it will be apparent that the toggle springs 112 will resist movement of the rod 68 in the left-hand direction into the application position to effect undesired resupply of pressure to the straight-air pipe.

Thus the rod 68 will again be maintained in lap position wherein the contact-bridging member 71 connects the contact members 73 and 75 to maintain the release electromagnet winding 44 energized and wherein contact member 72 is disengaged from the contact member 76 and effects interruption of the energizing circuit for the electromagnet winding 34 of the application magnet valve devices 16. It will thus be seen that upon a reduction in the pressure in control pipe 19, the master controller 21 operates through only one cycle to effect a corresponding reduction in the pressure in straight-air pipe 18 and thus in the degree of application of the brakes.

It will be apparent that the pressure in the control pipe 19 may be reduced in any desired number of steps to graduate the release of the brakes, the master controller device 21 operating through only one cycle of operation for each step of reduction to effect a corresponding reduction of the pressure in the straight-air pipe 18 and brake cylinders 9.

To effect complete release of the brakes, the operator shifts the brake valve handle 31 to release position and allows it to remain there, thus causing the pressure of the fluid in the control pipe 19 to be reduced to atmospheric pressure. Obviously, when the rod 68 is shifted in the right-hand direction in the manner previously described, to release position, in which the rollers 108 engage in the grooves 98 of the toggle levers 94, the application and release magnet valve devices 16 and 17 will be both deenergized. With the supply valve 33 seated and release valve 43 unseated, pressure in the brake cylinders 9, straight-air pipe 18 and chamber 61 of the master controller device 21 is reduced to atmospheric pressure. With the fluid in both the chambers 61 and 62 at atmospheric pressure, the rod 68 is thus maintained in release position, and the brakes accordingly remain released.

When the pressure in the control pipe 19 is reduced to atmospheric pressure, the pressure in each chamber 116 is also reduced to atmospheric pressure and thus each toggle spring 112 forces its associated piston 111 outwardly into contact with the annular rib 113. With the toggle springs 112 thus expanded, the force urging the rollers 108 into the grooves 98 against the toggle levers 94 is relieved and movement of the rod 68 into release position is thus insured.

Summary

Summarizing, it will be seen that I have disclosed an electro-pneumatic vehicle brake equipment including a master controller device of improved construction. The master controller device comprises a stabilizing or dampening arrangement for preventing pumping operation of the master controller 21 due to overcasting, either upon effecting an increase in pressure or a decrease in the pressure in a pipe, such as a straight-air pipe.

While I have disclosed only one embodiment of my invention it will be apparent that various omissions, additions or modifications may be made in the embodiment shown without departing from the spirit of the invention. It is, therefore, not my intention to limit the scope of my invention except as is necessitated by the scope of the prior art.

Having now described my invention, what I claim is new and desire to secure by Letters Patent is:

1. A control device comprising a first switch device and a second switch device, an element effective upon movement in one direction from a certain position to successively close said first switch and said second switch device and upon reverse movement in the opposite direction toward said certain position to successively open said second switch device and said first switch device, and means effective to yieldingly resist movement of said element out of a plurality of certain uniform positions with the same degree of resisting force, in one of which both of said switch devices are open, in another of which said first switch device is closed and said second switch device is open, and in the third of which both of said switch devices are closed.

2. A control device comprising a first switch device and a second switch device, an element effective upon movement in one direction from a certain position to successively close said first switch device and said second switch device and upon reverse movement in the opposite direction toward said certain position to successively open said second switch device and said first switch device, and a toggle mechanism effective to yieldingly resist movement of said element out of a plurality of certain positions in one of which both said switch devices are open, in another of which said first switch device is closed and said second switch device is open, and in a third of which both of said switch devices are closed.

3. A control device comprising a control element, fluid pressure operated means for shifting said control element in opposite directions, a toggle mechanism for yieldingly resisting movement of the control element, said mechanism comprising a toggle lever, a toggle spring, and fluid pressure operated means for varying the tension of said toggle spring.

4. In a vehicle brake system, in combination, a first pipe chargeable with fluid at different pressures, a second pipe, the fluid pressure in which controls the degree of braking force with which application of the brakes is effected, pneumatically operated self-lapping means for establishing a fluid pressure in the said second pipe corresponding substantially to the pressure established in the first pipe, and means effective to yieldingly resist operation of the self-lapping means out of lap position to effect an increase of the fluid pressure in said second pipe upon an increase of the fluid pressure in said first pipe and effective also to yieldingly resist operation of the self-lapping means out of lap position to effect a decrease of the fluid pressure in said second pipe upon a decrease of the pressure in said first pipe.

5. In a vehicle brake system, the combination of a first pipe and a second pipe, means for effecting application of the brakes to a degree corresponding to the fluid pressure established in said second pipe, fluid pressure operated self-lapping means controlled according to the pressure in said first pipe and said second pipe for establishing a pressure in said second pipe corresponding substantially to the pressure established in said first pipe, and a toggle mechanism effective when the said self-lapping means is in lap position to resist operation of the self-lapping means to either increase or decrease the pressure in said second pipe.

6. In a vehicle brake system, the combination of a first pipe and a second pipe, means for effecting application of the brakes to a degree corresponding to the pressure established in said second pipe, fluid pressure operated self-lapping means controlled according to the pressure in said first pipe and said second pipe for establishing a pressure in said second pipe corresponding substantially to the pressure established in said first pipe, and a toggle mechanism effective to exert a certain uniform force to yieldingly resist operation of the self-lapping means to effect either an increase or a decrease of pressure in the said second pipe.

7. In a vehicle brake system, the combination of a first pipe and a second pipe, means for effecting application of the brakes to a degree corresponding to the pressure established in said second pipe, fluid pressure operated self-lapping means controlled according to the pressure in said first pipe and said second pipe for establishing a pressure in said second pipe corresponding substantially to the pressure established in said first pipe, and a toggle mechanism for yieldingly resisting operation of the self-lapping means out of lap position, said toggle mechanism comprising a toggle lever, a toggle spring, and fluid pressure responsive means subject to the pressure in the said first pipe for varying the tension of said toggle spring.

8. In a vehicle brake system, the combination of a first pipe and a second pipe, means for effecting application of the brakes to a degree corresponding to the pressure established in said second pipe, fluid pressure operated self-lapping means controlled according to the pressure in said first pipe and said second pipe for establishing a pressure in said second pipe corresponding substantially to the pressure established in said first pipe, and a toggle mechanism for yieldingly resisting operation of the self-lapping means out of lap position, said toggle mechanism comprising a toggle lever, a toggle spring, and fluid pressure responsive means subject to the pressure in the said first pipe for increasing the tension of said toggle spring, and means preventing said fluid pressure responsive means from increasing the tension of the toggle spring beyond a certain degree.

9. A control device comprising a fluid pressure operated self-lapping means having a shiftable operating element, a toggle lever pivoted intermediate its ends and disposed so that one end cooperatively engages the said element, said lever having at its opposite end a plurality of arcuately spaced notches, and means adapted to yieldingly engage in each individual notch at different times to yieldingly resist movement of the said element out of a plurality of different corresponding positions.

10. A self-lapping control device comprising two movable abutments arranged in spaced coaxial relation, an operating stem connecting said abutments, said stem being shifted in one direction out of a normal position in response to the pressure of fluid acting on the outer face of one of said abutments and in the opposite direction toward said normal position in response to the pressure of fluid acting on the outer face of the other of said abutments, and a toggle mechanism disposed between said abutments and cooperating with said stem in such manner as to yieldingly resist movement of said stem in the said one direction or in the opposite direction.

11. A control device comprising fluid pressure operated self-lapping means including an operating element adapted to have a normal position, an operating position and a lap position between the operating position and the normal position, a toggle lever associated with said element, and a single resilient means cooperating with said lever, said lever and single resilient means being effective to resist movement of the operating element out of its lap position toward its normal position in one direction and also movement of the operating element out of lap position toward its operating position in the opposite direction.

ELLERY R. FITCH.